March 1, 1927.

H. T. VULTÉ

1,619,592

ANTISKID CHAIN

Filed March 31, 1926

Hermann T. Vulté,
By Samuel W. Balch
Attorney.

Patented Mar. 1, 1927.

1,619,592

UNITED STATES PATENT OFFICE.

HERMANN T. VULTÉ, OF NEW ROCHELLE, NEW YORK.

ANTISKID CHAIN.

Application filed March 31, 1926. Serial No. 98,700.

This invention relates to a chain for use with rubber vehicle tires to reduce slippage or skidding of the wheels on a slippery road bed, by which increased purchase on the roadbed is insured, side slip eliminated, slew prevented in turning corners, and difficulty avoided in climbing out of a rut. A further object is to increase the length of the tread sections of the chain so that they will have more yield and will relieve sudden strain, and to so connect the tread sections to the side sections that each tread section will act individually and independently of the other tread sections, and that the breakage of any tread section will not result in additional slack in the adjacent sections sufficiently to allow the chain to become detached from the wheel or become fouled in other parts of the vehicle.

In the accompanying sheet of drawings which forms a part of this description:

Figure 1:
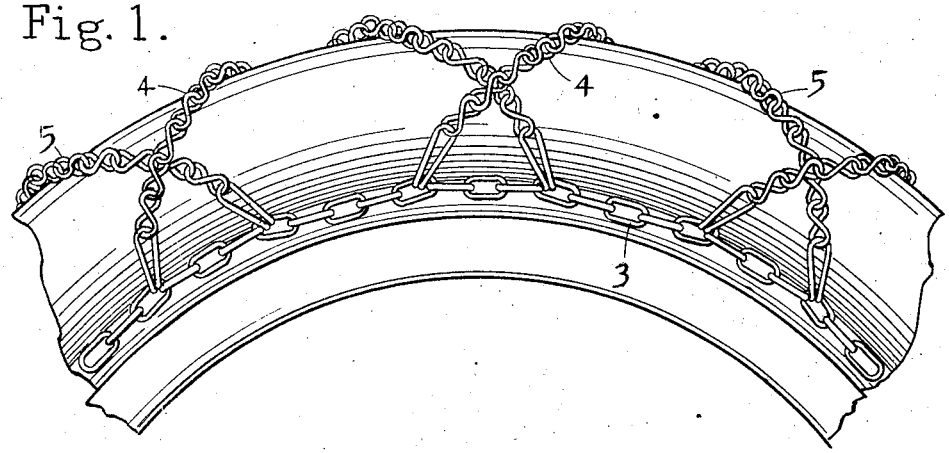
Figure 1 is a side elevation showing a portion of a vehicle wheel and tire together with a portion of an anti-skid chain which embodies this invention.
Figure 2:
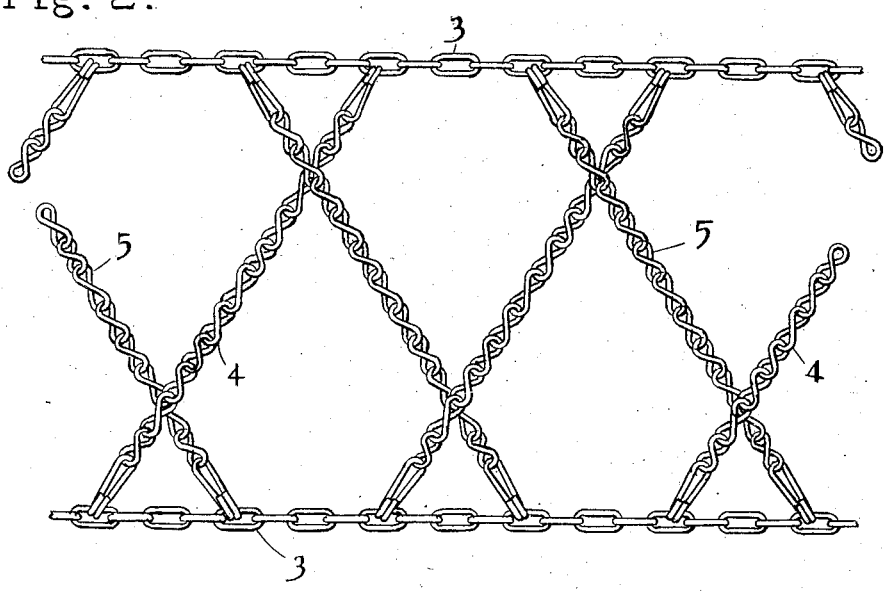
Fig. 2 is a plan view of a portion of the chain when detached and laid flat.

The chain comprises side sections 3, 3 which are circumferentially disposed when the chain is in place on the tire of a vehicle wheel, right diagonal tread sections 4, 4 and left diagonal tread sections 5, 5, each of which is attached at one end to one of the side sections and extends over the tire and is attached at its other end to the other side section. Each right diagonal tread section crosses two left diagonal tread sections, and each left diagonal tread section crosses two right diagonal tread sections. The tread sections are not connected to each other at the points of crossing and are consequently free throughout their length and therefore have more yield and opportunity to roll sufficiently to obtain an effective grip on the roadbed.

This invention is not limited to any particular form of links in making up the sections, or to any particular form of hooks or connectors for detachably joining the ends of the side sections, or for connecting the tread sections to the side sections.

It is to be noted that at each point of crossing one chain is lifted so as to come in contact with the road bed adjacent to the crossing point, particularly when the road bed is soft and additional grip is especially needed. Also each chain crosses over on one side and under on the other side.

I claim:

1. An anti-skid chain for a rubber-tired vehicle wheel which comprises side sections, right diagonal tread sections, and left diagonal tread sections, each of which is free of the other tread sections and crosses over or under adjacent tread sections at points which will come at the sides of a tire when applied to a vehicle wheel, the chain being constructed so that the tread sections are each in direct contact with the tire at the middle of its tread and are held away at one or the other of its sides.

2. An anti-skid chain for a rubber-tired vehicle wheel which comprises side sections, right diagonal tread sections, and left diagonal tread sections, each of which is free of the other tread sections and crosses over an adjacent tread section at one side of the tire and under an adjacent tread section at the other side of the tire when applied to a vehicle wheel, the chain being constructed so that the tread sections are each in direct contact with the tire at the middle of its tread and are held away at the side of crossing over.

HERMANN T. VULTÉ.